United States Patent [19]

Burkhardt et al.

[11] 4,101,530

[45] Jul. 18, 1978

[54] PROCESS FOR THE PRODUCTION OF POLYISOCYANATE MIXTURES CONTAINING BLOCKED ISOCYANATE GROUPS

[75] Inventors: Tilo Burkhardt; Manfred Schönfelder, both of Leverkusen, Germany

[73] Assignee: Bayer Aktiengesellschaft, Leverkusen, Germany

[21] Appl. No.: 734,832

[22] Filed: Oct. 22, 1976

[30] Foreign Application Priority Data

Nov. 7, 1975 [DE] Fed. Rep. of Germany ....... 2550156

[51] Int. Cl.$^2$ .............................................. C08G 18/81
[52] U.S. Cl. ................................ 528/45; 260/18 TN; 260/31.2 N; 260/31.4 R; 260/32.8 N; 560/125; 528/57; 528/60

[58] Field of Search .................. 260/77.5 TB, 75 NK, 260/75 NB; 560/125

[56] References Cited

U.S. PATENT DOCUMENTS 3,830,785  8/1974  Matsui et al. ................. 260/77.5 TB
4,007,215  2/1977  Hartmann et al. ........... 260/77.5 TB Primary Examiner—H.S. Cockeram
Attorney, Agent, or Firm—Gene Harsh; Lawrence S. Pope; Frederick H. Colen

[57] ABSTRACT

This invention relates to a process for the production of new polyisocyanate mixtures containing blocked isocyanate groups, to binders containing these polyisocyanate mixtures and to the use of the new polyisocyanate mixtures as an isocyanate component in polyurethane stoving lacquers.

23 Claims, No Drawings

PROCESS FOR THE PRODUCTION OF POLYISOCYANATE MIXTURES CONTAINING BLOCKED ISOCYANATE GROUPS

BACKGROUND OF THE INVENTION

Polyisocyanates containing blocked isocyanate groups and their use in polyurethane lacquers are known (cf., for example, Kunststoff-Handbuch, Vol. VII, Polyurethane, Carl Hanser Verlag, Munich (1966) pages 11-13, 21 et. seq.). For their use in polyurethane lacquers, these blocked polyisocyanates have to satisfy the following principal requirements:

(1) relatively low split-off temperatures for the shortest possible stoving time;
(2) little or no yellowing during stoving and brief overstoving;
(3) substantially universal compatibility with the reactants; and
(4) a substantially or, better still, completely nontoxic blocking agent having the lowest possible molecular weight to prevent excessive ballast from entering the lacquer and, during stoving, the atmosphere.

Unfortunately, conventional blocked polyisocyanates and donor systems only satisfy some of the above-mentioned requirements. For example, polyurethanes based on phenol-blocked aromatic polyisocyanates show a tendency towards yellowing and have poor weather resistance. Although aliphatic and cycloaliphatic polyisocyanates do not have this disadvantage, it has hitherto not been possible to find any blocked polyisocyanates having aliphatically-bound isocyanate groups which are compatible with substantially all the polyhydroxyl compounds commonly encountered in polyurethane chemistry. The blocked polyisocyanates according to DT-OS No. 2,342,603 are also unsatisfactory with regard to their compatibility with the polyhydroxyl compounds (cf. Comparison Examples 1 and 8). In addition, one disadvantage of the blocked polyisocyanates according to DT-OS No. 2,342,603 which should not be underestimated is the fact that their production involves the use of a monomer-free biuret polyisocyanate which in turn may only be obtained by a relatively complicated two-stage operation (preparing a mixture of biuret polyisocyanate and monomeric diisocyanate and subsequently removing the monomeric diisocyanate.)

The present invention provides a much simpler method, by comparison with the process according to DT-OS No. 2,342,603, of obtaining blocked polyisocyanates having aliphatically and cycloaliphatically bound (blocked) isocyanate groups which optimally satisfy all the practical requirements (1) to (4) mentioned above.

SUMMARY OF THE INVENTION

The present invention relates to a process for the production of polyisocyanate mixtures containing blocked isocyanate groups which are readily soluble in lacquer solvents, distinguished by the fact that polyhydroxyl compounds having a molecular weight in the range of from about 62 to 300 or mixtures of polyhydroxyl compounds having an average molecular weight of from about 62 to 300 are reacted with 3-isocyanato methyl-3,5,5-trimethyl cyclohexyl isocyanate to form a reaction mixture containing urethane groups and free isocyanate groups, the quantitative ratios between the reactants being selected in such a way that the reaction mixture contains from about 2 to 12 isocyanate groups per hydroxyl group, and the free isocyanate groups in the reaction mixture are blocked by reaction with blocking agents containing isocyanate-reactive methylene groups.

The present invention also relates to a mixture which is storable at room temperature and which is suitable for use as a binder for stoving lacquers, containing:

(a) at least one polyhydroxyl compound having a molecular weight in the range of from about 400 to 50,000, optionally in admixture with polyhydroxyl compounds having a molecular weight below about 400, and (b) a polyisocyanate component containing blocked isocyanate groups, the quantitative ratios between components (a) and (b) corresponding to an equivalent ratio of hydroxyl groups in components (a) to the blocked isocyanate groups in components (b) of from about 0.8:1 to 1.6:1, distinguished by the fact that a polyisocyanate mixture obtainable by the process according to the present invention is used as component (b).

Finally, the present invention also relates to the use of the polyisocyanate mixtures containing blocked isocyanate groups obtainable by this process as a polyisocyanate component in polyurethane stoving lacquers.

DETAILED DESCRIPTION OF THE INVENTION

Starting materials for the process according to the present invention are the following:

(1) 3-isocyanato methyl-3,5,5-trimethyl cyclohexyl isocyanate, also referred to as hereinafter as "isophorone diisocyanate" or "IPDI";

(2) polyhydroxyl compounds having a molecular weight in the range of from about 62 to 300 and mixtures of polyhydroxyl compounds having an average molecular weight of from about 62 to 300; and (3) blocking agents containing isocyanate-reactive C-H-groups.

Polyhydroxyl compounds suitable for use in the process according to the present invention include any polyols optionally containing ether bridges, especially diols or triols having aliphatically or cycloaliphatically bound hydroxyl groups having a molecular weight in the range of from about 62 to 300, preferably from about 62 to 200, such as ethylene glycol, 1,2-propylene glycol, 1,3-propylene glycol, diethylene glycol, 1,4-butylene glycol, pentane diol and neopentyl glycol, triols, for example, trimethylol ethane, trimethylol propane, trimethylol butane, 1,2,6-hexane triol and glycerol. These low molecular weight polyols may be used either individually or in admixture. It is particularly preferred to use triols, such as, in particular, trimethylol propane.

The reaction between IPDI and the low molecular weight polyol is preferably carried out in the absence of a solvent. However, it may also be carried out in solvents which do not contain any active hydrogen atoms, for example in ethyl acetate, butyl acetate, methyl ethyl ketone, toluene, xylene, etc.

For the reaction, IPDI and the low molecular weight polyol are used in such quantities that the NCO/OH equivalent ratio amounts to from about 2 to 12 and preferably to from about 4 to 12.

The reaction time generally amounts to from about 15 minutes to 4 hours at a reaction temperature in a range of from about 50° to 150° C, preferably in the range of from about 80° to 100° C.

During this reaction, all the OH-groups in the low molecular weight polyol are reacted with the IPDI, whereas the excess isocyanate compound is not reacted. In order to accelerate the NCO-OH reaction, catalysts may also be added to the reaction mixture. Suitable catalysts are: organo metallic compounds, in particular organo tin compounds, preferably tin (II) salts of carboxylic acids, such as tin (II) acetate, tin (II) laurate and dialkyl tin salts of carboxylic acids, such as dibutyl tin diacetate, dibutyl tin dilaurate, dibutyl tin maleate or dioctyl tin diacetate.

According to the present invention, however, it is preferred to carry out the reaction in the absence of a catalyst.

A major advantage of the process according to the present invention is the fact that the reaction product obtained by reacting a diisocyanate with a low molecular weight polyol in the preferred NCO/OH ratio of from about 4 to 12 does not have to be aftertreated in order to separate off the monomer by thin layer distillation or by solvent extraction.

Instead the adduct of IPDI with the low molecular weight polyol obtained in this way is directly reacted with a blocking agent for isocyanates. Although, theoretically, the isocyanate blocking agent should be used in a quantity of 1 mole of blocking agent per isocyanate equivalent, it is best to use from about 98 to 110% of the theoretically necessary quantity of blocking agent.

Of the blocking agents known from the literature, it is preferred to use the methylene-active compounds, such as malonic acid dimethyl ester, malonic acid diethyl ester, acetoacetic acid ethyl ester and acetyl acetone, having split-off temperatures of from about 120° to 130° C. It is particularly preferred to use malonic acid diethyl ester because it has numerous advantages in regard to resplitting velocity, compatibility, minimal tendency towards yellowing and physiology. The blocking reaction is catalyzed by organic alkali compounds, for example sodium ethylate and sodium malonate. It is preferred to use alkali compounds which are soluble in the blocking agent malonic acid diethyl ester. A catalyst preferably used in accordance with the present invention is sodium phenolate. The catalyst is preferably used in a quantity of from about 0.1 to 2% and, with particular preference, in a quantity of from about 0.1 to 0.5%, based on the total weight of the reaction components.

Addition of the malonic acid diethyl ester with the IPDI modified by partial reaction with a low molecular weight polyol is preferably carried out under nitrogen in the absence of moisture.

The reaction according to the present invention is preferably carried out by dissolving the catalyst in the malonic acid diethyl ester and continuously introducing the isocyanate mixture dropwise. This produces an increase in temperature from room temperature (which is the preferred starting temperature) to from about 80° to 90° C. An upper temperature limit of about 95° C should not be exceeded because uncontrolled secondary reactions causing discoloration and undesirable viscosity from increasing crosslinking may be expected to occur beyond that temperature. The modified isocyanate may be added, for example, over a period of from about 1 to 2 hours in order fully to utilize the activity of the catalyst. In order to obtain substantially complete blocking, further reaction is carried out at about 90° C. Depending upon the size of the batch, the blocking reaction is over after from about 2 to 3 hours; in other words the free isocyanate group content has fallen to below about 0.5%, by weight. The NCO-value falls to zero within a few days, inter alia, because of secondary reactions at room temperature.

It is surprising that it should be possible with the catalyst preferably used in accordance with the present invention sodium phenolate to obtain blocked isocyanate adducts of relatively moderate viscosity because sodium phenolate is a known catalyst for isocyanate trimerization reactions.

Accordingly, it had been expected that extremely non-uniform, substantially insoluble isocyanurate-containing products would be formed under the reaction conditions. However, it was surprisingly found that malonic ester adducts of relatively moderate viscosity, but which are highly soluble in lacquer solvents, are reproducibly obtained.

The described embodiment of the process according to the present invention for producing the blocked isocyanate component is a two-stage process. In the first stage, the IPDI is modified by partial reaction of the isocyanate with a low molecular weight polyol, followed by blocking in a subsequent reaction. Since it is best to add the modified isocyanate to the blocking agent for the blocking reaction, it is advisable to use two reaction vessels.

In a second preferred embodiment of the process according to the present invention, the blocked isocyanate component may also be prepared by a one-pot process from the individual components IPDI, low molecular weight polyol, malonic acid diethyl ester and the alkaline catalyst. Surprisingly, the products obtained are lighter and only slightly more viscous and show none of the red tinges such as are occasionally encountered in the two-stage process.

So far as the stoichiometry of the starting materials is concerned, there is no difference between the one-stage process and the two-stage process. In a preferred form of the second embodiment of the process according to the present invention, the catalyst, for example sodium phenolate, is dissolved in the blocking agent, the quantity of blocking agent again being based on the readily calculated concentration of isocyanate still present on completion of formation of the polyol/IPDI adduct, and the blocking agent again best being used in a quantity of from about 98 to 110% of the theoretically necessary quantity.

Low molecular weight polyol is then added to the solution of the catalyst in a quantity corresponding to an NCO/OH ratio of at least about 2, preferably from about 4 to 12. It is immaterial whether or not the polyol used dissolves in the solution of the catalyst in the blocking agent at room temperature. The IPDI is then added dropwise, preferably with stirring, to this solution or mixture consisting of blocking agent, catalyst and low molecular weight polyol. This produces a rise in the reaction temperature from room temperature (which is the preferred starting temperature) to from about 80° to 90° C. In this case, too, the temperature should not exceed an upper limit of about 95° C. The IPDI is best added over a period of from about 1 to 2 hours. The after reaction at about 90° C may be terminated at a free NCO-content of about 0.5%, by weight. It is usually over after from about 2 to 3 hours.

The process according to the present invention may, of course, also be modified to the extent that all the polyol is reacted with some of the IPDI in a first stage, followed on completion of the reaction by addition of the blocking agent and the catalyst. The rest of the IPDI is then added dropwise to the resulting solution, followed by completion of the blocking reaction.

The blocked IPDI/polyol adduct obtained by the process according to the present invention optimally satisfies the requirements made of a blocked isocyanate component in one-component polyurethane stoving lacquers, and together with compounds containing isocyanate-reactive hydrogen atoms gives high-quality lacquers and paints coupled with substantially universal compatibility.

The end products of the process according to the present invention are valuable polyisocyanate components for polyurethane stoving lacquers. In this preferred application, the end products of the process according to the present invention are combined with the known compounds containing isocyanate-reactive groups, preferably hydroxyl groups, which are at least difunctional in the sense of the isocyanate-addition reaction for the production of a heat-crosslinkable binder. To this end, the quantitative ratios between the components are preferably selected in such a way that, for every isocyanate-reactive group in the last of the components just mentioned, the binder contains from about 0.8 to 1.6 and preferably from about 1.0 to 1.1 isocyanate groups blocked by methylene-active compounds. It is possible during the actual production of the binders according to the present invention to use the lacquer solvents which are in any case required for their subsequent use.

The compounds containing at least two isocyanate-reactive hydrogen atoms present in the binders according to the present invention generally have a molecular weight of from about 400 to 50,000, preferably from about 400 to 4,000. However, it is also possible to use low molecular weight polyols having a molecular weight below about 400. The only requirement is that the compounds used should not be volatile under the stoving conditions.

Preferred compounds containing isocyanate-reactive hydrogen atoms are the known polyester polyols having a molecular weight in the range of from about 400 to 4000 and a hydroxyl number in the range of from 80 to 600, polyether polyols having a molecular weight in the range of from about 400 to 4000 and a hydroxyl number in the range of from about 50 to 600 and polyacrylates containing hydroxyl groups having a molecular weight in the range of from about 400 to 50,000, more especially in the range of from about 1,000 to 10,000, and a hydroxyl number in the range of from about 8 to 300.

In addition to these preferred polyhydroxyl compounds it is also possible in accordance with the present invention to use, for example, any at least difunctional compounds containing amino groups, thiol groups or carboxyl groups, such as polyhydroxy polyacetals, polyhydroxy carbonates, polyhydroxy polyester amides or polythioethers containing terminal hydroxyl groups or sulphydryl groups.

The polyesters containing hydroxyl groups suitable for use in accordance with the present invention are, for example, reaction products of polyhydric, preferably dihydric and, optionally, trihydric alcohols with polybasic, preferably dibasic carboxylic acids. Instead of using the free polycarboxylic acids, it is also possible to use the corresponding polycarboxylic acid anhydrides or corresponding carboxylic acid esters of lower alcohols or mixtures thereof for producing the polyesters.

The polycarboxylic acids may be aliphatic, cycloaliphatic, aromatic and/or heterocyclic and may optionally be substituted, for example by halogen atoms, and/or be unsaturated. Examples of such polycarboxylic acids are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acids, optionally in admixture with monomeric fatty acids, terephthalic acid dimethyl ester and terephthalic acid bis-glycol ester.

Suitable polyhydric alcohols are, for example, ethylene glycol, 1,2- and 1,3- propylene glycol, 1,4-butylene glycol and 2,3-butylene glycol, 1,6-hexane diol, 1,8-octane diol, neopentyl glycol, cyclohexane dimethanol (1,4-bishydroxymethyl-cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example $\epsilon$-caprolactone, or hydroxy carboxylic acids, for example $\omega$-hydroxy caproic acid or hydroxy pivalic acid, may also be used.

The polyethers containing at least two, generally from 2 to 8 and preferably 2 or 3, hydroxyl groups suitable for use in accordance with the present invention are also known compounds and may be obtained, for example, by polymerizing epoxides, such as ethylene oxide, propylene oxide, butylene oxide, tetrahydrofuran, styrene oxide or epichlorohydrin, on their own, for example in the presence of boron trifluoride, or by the addition of these epoxides, optionally in admixture or successively, with starting components containing reactive hydrogen atoms, such as alcohols or amines, for example water, ethylene glycol, 1,3-propylene glycol, trimethylol propane, 4,4'-dihydroxy diphenyl propane, aniline, ammonia, ethanolamine and ethylene diamine. Sucrose polyethers, of the type described, for example in German Auslegeschrift Nos. 1,176,358 and 1,064,938 and U.S. Pat. Nos. 3,153,002 and 2,927,918 may also be used in accordance with the present invention.

In many cases, it is preferred to use polyethers of the type predominantly containing primary OH groups (up to about 90%, by weight, based on all the OH-groups present in the polyether). Polyethers modified by vinyl polymers, of the type formed by polymerizing styrene or acrylonitrile in the presence of polyethers (U.S. Pat. Nos. 3,381,351; 3,304,273; 3,523,093; 3,110,695; German Pat. No. 1,152,536), are also suitable, as are olybutadienes containing OH-groups.

Suitable polyhydroxy polyacetals are, for example, the compounds which may be obtained from glycols, such as diethylene glycol, triethylene glycol, 4,4'-dioxethoxy diphenyl dimethyl methane and hexane diol, and formaldehyde. Polyacetals suitable for the purposed of the present invention may also be obtained by polymerizing cyclic acetals.

Suitable polycarbonates containing hydroxyl groups are those known compounds which may be obtained, for example, by reacting diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

Suitable polyhydroxy polyester amides and polyamides are, for example, the predominantly linear condensates obtained from polybasic saturated and unsaturated carboxylic acids or their anhydrides and polyvalent saturated and unsaturated aminoalcohols, diamines, polyamines and mixtures thereof.

Polyhydroxyl compounds already containing urethane or urea groups and optionally modified natural polyols, such as castor oil, carbohydrates and starch, may also be used. Addition products of alkylene oxides with phenol-formaldehyde resins or even with urea-formaldehyde resins may also be used in accordance with the present invention.

The polyacrylates containing hydroxyl groups which are also preferred in addition to the polyester polyols and polyether polyols may be obtained by polymerizing compounds corresponding to one of the following general formula:

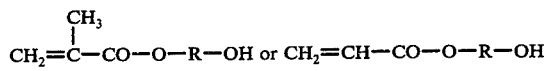

wherein R represents a lower alkylene radical containing from 2 to 6 carbon atoms; or by copolymerizing these compounds with other polymerizable, ethylenically unsaturated compounds containing from 2 to 10 carbon atoms in the molecule; for example, styrene, acrylic acid, dibutyl fumarate, methacrylic acid, acrylic acid esters, methacrylic acid esters, ethylene, propylene, vinyl chloride, vinylidene chloride, butadiene, isoprene and vinyl acetate. The number of OH-groups in the molecule of the homopolymers or copolymers of this class may lie within a wide range, depending upon the type of starting monomer(s) used and upon the degree of polymerization, although polymers containing from 2 to 20 OH-groups are preferably used in the binders according to the present invention. In one particularly preferred form, polymers containing from 4 to 12 OH-groups in the molecule are used.

Particular examples of polymers of this class which may be used are homopolymers of compounds corresponding to one of the above general formula having a degree of polymerization of from about 5 to 15 and copolymers of the compounds corresponding to one of the above general formula with one or more polymerizable monoethylenically unsaturated monomers, the content of compounds corresponding to one of the above general formula in the copolymers amounting to from about 5 to 95 parts, by weight, and the molecular weight of the copolymers being within the ranges indicated above. These polymers of the acrylic type may be obtained by methods of the type described, for example, in U.S. Pat. No. 3,028,367.

As mentioned above, a lacquer solvent or lacquer solvent mixture is preferably used during production of the binders by mixing the polyisocyanate components with the components containing isocyanate-reactive groups. This solvent or solvent mixture preferably remains in the binder until it is used. However, it is of course also possible to use a solvent simply to promote thorough mixing of the binder components and subsequently to distill off this solvent (in vacuo) leaving a ready-to-use binder mixture in solvent-free form which may be redissolved in lacquer solvents at any later stage.

Suitable solvents are, for example, toluene, xylene, butyl acetate, ethyl acetate, ethylene glycol-monoethyl ether acetate (EGA), methyl ethyl ketone or methyl isobutyl ketone, also mixtures of these solvents.

In the ready-to-use lacquers prepared using the binders according to the present invention, the solvents are generally present in such quantities that the content of involatile binder constituents is no less than about 20%, by weight, and preferably from about 30 to 50%, by weight.

Additives, such as hardening catalysts, pigments, dyes and levelling aids, may be added as required to the lacquers and paints based on the binders according to the present invention.

The lacquers and paints produced using the binders according to the present invention, as one-component polyurethane stoving lacquers, may be stored as such for prolonged periods at room temperature without gel formation or any other undesirable changes occurring. They may be diluted as required to a suitable concentration and applied by the conventional methods, for example spraying or spread coating, and heated, generally to temperatures of from about 100° to 150° C, preferably from 120° to 130° C, in order to harden the paint film.

The lacquers may be used as coating agents for under-coating or surface coating a variety of different substrates. The hardened paint films formed with them show uniform and excellent mechanical and chemical properties and weather resistance, especially hardness, high impact elasticity and excellent and permanent gloss without any signs of yellowing.

The polyisocyanate mixtures containing blocked isocyanate groups obtainable by the process according to the present invention are also suitable, in particular by virtue or their substantially universal compatibility with all commercially important compounds containing isocyanate-reactive hydrogen atoms, and by virtue of the low split-off temperature (the split-off temperature is the temperature at which the blocked polyisocyanate mixtures in combination with compounds containing isoycanate-reactive groups enter into reaction, with elimination of the blocking agent, with the compounds containing isocyanate-reactive groups) in a range of from about 120° to 130° C for example as additives for other lacquer systems containing binder components with active hydrogen atoms, in order optimally to improve their properties, in particular their gloss, hardness, impact elasticity and resistance to yellowing.

In following examples all "parts" are unless otherwise indicated "parts by weight".

EXAMPLE 1

(Comparison Example using the polyisocyanate according to Example 2 of DT-OS No. 2,342,603 corresponding to British Pat. No. 1,442,024).

The solution of a biuret polyisocyanate containing isocyanate groups blocked by malonic acid diethyl ester, prepared in accordance with Example 2 of DT-OS No. 2,342,603 is combined with the polyesters specified below in an NCO/OH equivalent ratio of 1:1. The mixture is diluted to a viscosity of 200 cP at 20° C using a solvent mixture of equal parts, by volume, of ethyl glycol acetate and xylene, and subsequently stoved for 30 minutes at 120° C both in the form of a clear lacquer and in the form of a pigmented lacquer (standard commercial-grade titanium dioxide white pigment).

| | |
|---|---|
| Polyester (I): | polyester based on 31.9 parts, by weight, of phthalic acid, 2.1 parts, by weight, of maleic acid anhydride, 23.7 parts, by weight, of α-ethyl hexanoic acid, 11.1 parts, by weight, of adipic acid and 43.7 parts, by weight, of trimethylol propane (OH number 160–165) |
| Polyester (II): | polyester based on 48.5 parts, by weight, of phthalic acid anhydride, 20.5 parts, by weight, of maleic acid anhydride and 51.2 parts, by weight of trimethylol propane (OH number 250–270) |
| Polyester (III): | polyester based on 43.9 parts, by weight, of adipic acid, 10.6 parts, by weight, of phthalic acid anhydride 17.5 parts, by weight, of 1,2-propylene glycol, 42.6 parts, by weight, of trimethylol propane and 3.2 parts, by weight, of trimethylol propane first distillation cut (OH number 280–300) |
| Polyester (IV): | polyester based on 58 parts, by weight, of adipic acid, 6.3 parts, by weight, of phthalic acid anhydride, 21 parts, by weight, of maleic acid anhydride, 38.4 parts, by weight, of 1,2-propylene glycol, 13.9 parts, by weight, of trimethylol propane and 4.5 parts, by weight, of trimethylol propane first distillation out (OH number 160–175) |
| Polyester (V): | polyester based on 41.8 parts, by weight of phthalic acid anhydride, 7.6 parts, by weight, of trimethylol propane, 16.7 parts, by weight, of 1,6-hexane diol and 33.9 parts, by weight, of hydrogenated bisphenol A (OH number 65–70) |

| | Clear lacquer | Pigmented lacquer |
|---|---|---|
| (a) polyester (I) | clear | matt |
| (b) polyester (II) | clear | glossy |
| (c) polyester (III) | clear | matt |
| (d) polyester (IV) | clouded | matt |
| (e) polyester (V) | clouded | matt |
| (f) polyestr (I) + (II) | clear | matt |

The above Table clearly shows that the malonic-ester-blocked biuret polyisocyanate used for comparison is not universally compatible with polyester polyols and above all that the pigmented lacquer mixtures, except for one, are unusable. The matt appearance of the pigmented lacquer indicates the poor compatibility of the pigments with the binder composition.

EXAMPLE 2

In a 4 liter three-necked flask equipped with a stirrer, internal thermometer and reflux condenser and filled with nitrogen, 134 g (1 mole) of trimethylol propane are introduced into 2.664 kg (12 moles) of isophorone diisocyanate (NCO/OH ratio = 8:1), and the reaction mixture is stirred for 30 minutes at 90° C. The NCO-content of the trimethylolpropane-modified isophorone diisocyanate then amounts to 31.3%, by weight.

In a one liter three-necked flask equipped with a stirrer, internal thermometer and condenser and filled with nitrogen, 2.7 g of sodium phenolate (NaOPH) are dissolved at room temperature in 394 g (2.46 moles) of malonic acid diethyl ester. 300 g of the modified isocyanate (31.3%, by weight = 2.24 NCO-equiv.) are added dropwise to the solution over a period of 40 minutes.

Under the effect of the exothermic reaction, the temperature inside the flask rises to approximately 80° C. After stirring for 2 hours at 90° C, the blocking reaction is terminated at an NCO content of 0.1% by weight.

EXAMPLE 3

In a 4 liter three-necked flask equipped with a stirrer, internal thermometer and reflux condenser and filled with nitrogen, 268 g (2 moles) of trimethylol propane are introduced into 2.664 kg (12 moles) of isophorone diisocyanate (NCO/OH-ratio = 4:1) and the reaction mixture is stirred for 4 hours at 90° C. The NCO-content is found by titration to be 26.3%, by weight.

In a 1 liter three-necked flask equipped with a stirrer, internal thermometer and reflux condenser and filled with nitrogen, 2.5 g of NaOPH are dissolved at room temperature in 316 g of malonic acid diethyl ester (1.96 moles). 300 g of the modified isocyanate (26.3%, by weight, of NCO = 1.88 NCO-equivalents) are added dropwise to the solution over a period of 30 minutes. Under the effect of the exothermic reaction, the temperature inside the flask rises to approximately 75° C. After stirring for 2.5 hours at 90° C, the reaction is terminated at an NCO-content of ≦ 0.1% by weight.

EXAMPLE 4

In a 4 liter three-necked flask equipped with a stirrer, internal thermometer and condenser and filled with nitrogen, 89.8 g (0.67 mole) of trimethylol propane are introduced into 2.664 g (12 moles) of isophorone diisocyanate (NCO/OH-ratio = 12:1), followed by stirring for 1 hour at 90° C. The NCO-content is found by titration to be 33.8%, by weight.

In a 1 liter three-necked flask equipped with a stirrer, internal thermometer and reflux condenser and filled with nitrogen, 2.8 g of NaOPH are dissolved at room temperature in 408 g (2.55 moles) of malonic acid diethyl ester. 300 g of the modified isocyanate (33.8%, by weight, NCO = 2.41 NCO - equivalents) are added dropwise to the solution over a period of 60 minutes. Under the effect of the exothermic reaction, the temperature inside the flask rises to approximately 90° C. After stirring for 2 hours at 90° C, the reaction is terminated at an NCO-content of ≦ 0.2% by weight.

EXAMPLE 5

In a one liter three-necked flask equipped with a stirrer, internal thermometer and reflux condenser and filled with nitrogen, 2.2 g of sodium phenolate are dissolved at room temperature in 315.6 g (1.97 moles) of malonic acid diethyl ester. 11.2 g (1/12 mole) of trimethylol propane are added to the solution, followed by the dropwise addition over a period of 45 minutes of 222 g (1 mole) of isophorone diisocyanate. The reaction temperature rises to approximately 90° C. After stirring for 2 hours at 90° C, the reaction is terminated at an NCO-content of 0.4%, by weight. Through an after-reaction at room temperature, the NCO-content falls to zero within a few days.

EXAMPLE 6

The blocked isocyanate components produced in accordance with Examples 2 to 6 were tested for compatibility and pigmentability in accordance with Example 1. Clear, glossy films and paints with outstanding properties were obtained in every case.

EXAMPLE 7

The following polyhydroxyl compounds were used for Examples 7 and 8:

| | |
|---|---|
| polyhydroxyl compound (VI): | polyester based on 25 8 parts, by weight, of isophthalic acid, 25.8 parts, by weight, of phthalic acid, 20.8 parts, by weight, of trimethylol propane and 27.5 parts, by weight, of hexane diol (OH number 165) |
| polyhydroxyl compound (VII): | = polyester (I) |
| polyhydroxyl compound (VIII): | a mixture of 60%, by weight, of polyhydroxyl polyacrylate (A) and 40%, by weight, of polyester polyol (B) (OH number 100) (A): copolymer of styrene, butyl acrylate, hydroxy butyl methacrylate and acrylic acid (B): 22 parts of branched synthetic $C_{18}$ fatty acid, 22 parts of benzoic acid, 29.8 parts of phthalic acid anhydride, 1.7 parts of maleic acid anhydride 16.2 parts of trimethylol propane and 16 8 parts of pentaerythritol. |

Lacquer combinations and their film properties are shown in Table 1 below.

Table 1

| | | | | | | |
|---|---|---|---|---|---|---|
| Polyhydroxyl compound (VI), 70% solution (parts) | 143.0 | | | 143.0 | | |
| Polyhydroxyl compound (VII), 75% solution (parts) | | 133.0 | | | 133.0 | |
| Polyhydroxyl compound (VIII), 60% solution (parts) | | | 167.0 | | | |
| Solvent 1111[1] (parts) | 278.0 | 288.3 | 212.4 | 183.3 | 193.3 | 129.9 |
| Standard silicone oil (wetting agent)10%[2] (parts) | 1.9 | 1.9 | 1.6 | 1.9 | 1.9 | 1.6 |
| Standard titanium white pigment (rutile) (parts) | — | — | — | 95.0 | 95.0 | 82.5 |
| Blocked polyisocyanate, 75% in EGA/xylene (parts) 1:1[3] | 119.8 | 119.8 | 84.6 | 119.8 | 119.8 | 84.6 |
| NCO/OH 1:1; 35% binder | | | | | | |
| Elasticity (E-value after 1 day at room temperature[4] | 7.8 | 5.6 | 0.8 | 7.5 | 2.2 | 0.7 |
| Impact indentation after 1 day at room temperature[5] | 52 | 11.5 | <10 | <10 | <10 | <10 |
| Solvent resistance after 1 day at room temperature[6] | 0,0,1,1[3] | 0,0,2,2 | 0,0,2,2 | 1,1,1,1 | 1,1,2,1 | 0,0,1,1 |
| Pencil hardness after 1 day at room temperature | 3 H | 2 H | 2 H | 3 H | 3 H | 3 H |
| Shelf life at room temperature and 50°C | >6 months | >6 months | >4 months | >6 months | >6 months | >4 months |

The films are stoved for 35 minutes at 130° C
Substrate: glass plates and 0.5mm aluminum sheet

[1] ethyl acetate/EGA/butyl acetate/xylene (mixture of equal parts by volume)
[2] in solvent 1111
[3] blocked isocyanate according to Example 2
[4] mm indentation
[5] [kg cm]
[6] 1 minute in toluene; in ethyl acetate; in EGA; in acetone; 0=insoluble unchanged 1=just scratchable, 2=scratchable, 3=easily scratchable, 4=softens

EXAMPLE 8 (Comparison Example)

BPK 1: = blocked polyisocyanate according to DT-OS No. 2,342,603

BPK 5: = blocked polyisocyanate according to Example 5

Table 2

| | | |
|---|---|---|
| Polyhydroxyl compound (VI), 70% solution (parts) | 143.0 | 143.0 |
| Solvent 1111 (parts)[1] | 183.3 | 214.9 |
| Standard silicone oil (wetting agent) 10% (parts)[2] | 1.9 | 2.1 |
| Standard titanium white pigment (rutile) (parts) | 95.0 | 102.5 |
| BPK 5, 75% solution (parts) | 119.8 | — |
| BPK 1, 85% solution (parts) | — | 123.5 |
| Appearance of the stove films: | glossy | matt |
| NCO/OH 1:1, 35% binder | | |

[1] same as in Table I
[2] same as in Table I

EXAMPLE 9

In a 1 liter three-necked flask equipped with a stirrer, internal thermometer and reflux condenser and filled with nitrogen, 11.2 g (1/12 mole) of trimethylol propane and 55.5 g (1/4 mole) of isophorone diisocyanate are combined and heated, with stirring, to 90° C. After 20 minutes, 315.6 g (1.97 mole) of malonic acid diethyl ester and 2.2 g of sodium phenolate are added. The temperature falls to approximately 50° C. The reaction mixture is then stirred at the highest possible stirrer speed for a period of 15 minutes without heating, after which the rest of the isophorone diisocyanate (166.5 g = 3/4 mole) is added dropwise so quickly that the temperature inside the flask does not exceed 90° C. After stirring for 2 hours at 90° C, the reaction is terminated at an NCO-content of $\leq$ 0.2% by weight.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyisocyanate mixtures containing blocked isocyanate groups which are readily soluble in lacquer solvents, wherein polyhydroxyl compounds having a molecular weight in the range of from about 62 to 300 or mixtures of polyhydroxyl compounds having an average molecular weight of from about 62 to 300 are reacted with 3-isocyanato methyl-3,5,5-trimethyl cyclohexyl isocyanate to form a reaction mixture containing urethane groups and free isocyanate groups, the quantitative ratios between the reactants being selected in such a way that the reaction mixture contains from about 2 to 12 isocyanate groups per hydroxyl group, and the free isocyanate groups in the reaction mixture are blocked by reaction with blocking agents containing isocyanate-reactive methylene groups, 2. The process of claim 1 in which the said starting materials are reacted simultaneously in a one-pot process.

3. A mixture storable at room temperature and suitable for use as a binder for stoving lacquers, containing
   (a) at least one polyhydroxyl compound having a molecular weight in the range of from about 400 to 50,000, optionally in admixture with polyhydroxyl compounds having a molecular weight below about 400, and
   (b) a polyisocyanate component containing blocked isocyanate groups, the quantitative ratios between components (a) and (b) corresponding to an equivalent ratio of hydroxyl groups in component (a) to the blocked isocyanate groups in component (b) of from about 0.8:1 to 1.6:1, characterized in that polyisocyanate mixtures containing blocked isocyanate groups obtainable in accordance with claim 1 are used as component (b).

4. A polyisocyanate component for stoving lacquers comprising the polyisocyanate mixtures containing blocked isocyanate groups produced by the process of claim 1.

5. A process for the production of polyisocyanate mixtures containing blocked isocyanate groups which are soluble in lacquer solvents comprising reacting
   (a) polyhydroxyl compounds having a molecular weight of from about 62 to 300,
   (b) 3-isocyanato methyl-3,5,5-trimethyl cyclohexyl isocyanate wherein the NCO/OH equivalent ratio of (b) to (a) is from about 2 to 12, and
   (c) blocking agents containing isocyanate-reactive methylene groups, said blocking agents present in an amount from about 98 to 110% of the theoretical amount necessary to block the free isocyanate groups of reaction mixture (a) and (b) any.

6. The process of claim 5 wherein the blocking agents are selected from the groups consisting of malonic acid dimethyl ester, malonic acid diethyl ester, acetoacetic acid ethyl ester, and acetyl acetone.

7. The process of claim 6 wherein the blocking agent is malonic acid diethyl ester.

8. The process of claim 5 wherein organic alkali compounds are used to catalyze the blocking reaction between the blocking agents and the reaction mixture of components (a) and (b).

9. The process of claim 8 wherein the catalyst is present in from about 0.1 to 2% by weight based on the total weight of the reaction components.

10. The process of claim 8 wherein the catalyst is selected from the group consisting of sodium ethylate, sodium malonate and sodium phenolate.

11. The process of claim 10 wherein the catalyst is sodium phenolate.

12. The process of claim 5 wherein component (a) is first reacted with component (b) in a first reaction vessel, and the reaction mixture of components (a) and (b) is subsequently reacted with component (c) in a second reaction vessel.

13. The process of claim 5 wherein the starting components are reacted simultaneously in one reaction vessel.

14. The polyisocyanate mixtures produced by the process of claim 5.

15. A mixture which is storable at room temperature comprising
   (a) at least one polyhydroxyl compound having a molecular weight of from about 400 to 50,000, and
   (b) a polyisocyanate mixture containing blocked isocyanate groups comprising the reaction product of
      (i) polyhydroxyl compounds having a molecular weight of from about 62 to 300,
      (ii) 3-isocyanato methyl-3,5,5-trimethyl cyclohexyl isocyanate wherein the NCO/OH equivalent ratio of (ii) to (i) is from about 2 to 12, and
      (iii) blocking agents containing isocyanatereactive methylene groups, said blocking agents present in an amount from about 98 to 110% of the theoretical amount necessary to block the free isocyanate groups of reaction mixture (i) and (ii),
   wherein any unreacted monomeric diisocyanates are not removed, and
   wherein the equivalent ratio of hydroxyl groups in component (a) to the blocked isocyanate groups in component (b) is from about 0.8:1 to 1.6:1.

16. The mixture of claim 14 wherein polyhydroxyl compounds having a molecular weight of below about 400 are used in admixture with the at least one polyhydroxyl compound having a molecular weight of from about 400 to 50,000.

17. A binder for stoving lacquers comprising the mixture of claim 14.

18. A process for the production of polyisocyanate mixtures containing blocked isocyanate groups which are readily soluble in lacquer solvents, wherein polyhydroxyl compounds having a molecular weight in the range of from about 62 to 300 or mixtures of polyhydroxyl compounds having an average molecular weight of from about 62 to 300 are reacted with 3-isocyanato methyl-3,5,5-trimethyl cyclohexyl isocyanate to form a reaction mixture containing urethane groups and free isocyanate groups, the quantitative ratios between the reactants being selected in such a way that the reaction mixture contains from about 2 to 12 isocyanate groups per hydroxyl group, and the free isocyanate groups in the reaction mixture are blocked by reaction with blocking agents containing isocyanate-reactive methylene groups, whereby the polyhydroxyl-isocyanate reaction and the blocking reaction are carried out simultaneously in one reaction vessel.

19. A process for the production of polyisocyanate mixtures containing blocked isocyanate groups which are soluble in lacquer solvents comprising reacting
   (a) polyhydroxyl compounds having a molecular weight of from about 62 to 300,
   (b) 3-isocyanato methyl-3,5,5-trimethyl cyclohexyl isocyanate wherein the NCO/OH equivalent ratio of (b) to (a) is from about 2 to 12,
   (c) blocking agents containing isocyanate-reactive methylene groups, said blocking agents present in an amount from about 98 to 110% of the theoretical amount necessary to block the free isocyanate groups of reaction mixture (a) and (b), and
   (d) catalytic amounts of organic alkali compounds.

20. The process of claim 19 wherein the catalyst is present in from about 0.1 to 2% by weight based on the total weight of the reaction components.

21. The process of claim 19 wherein the catalyst is selected from the group consisting of sodiumethylate, sodium malonate and sodium phenolate.

22. The process of claim 21 wherein the catalyst is sodium phenolate.

23. A process for the production of polyisocyanate mixtures containing blocked isocyanate groups which are soluble in lacquer solvents comprising reacting simultaneously in one reaction vessel
   (a) polyhydroxyl compounds having a molecular weight of from about 62 to 300,
   (b) 3-isocyanato methyl-3,5,5-trimethyl cyclohexyl isocyanate wherein the NCO/OH equivalent ratio of (b) to (a) is from about 2 to 12, and
   (c) blocking agents containing isocyanate-reactive methylene groups, said blocking agents present in an amount from about 98 to 110% of the theoretical amount necessary to block the free isocyanate groups of reaction mixture (a) and (b).

* * * * *